United States Patent
Huang

(10) Patent No.: US 12,191,611 B1
(45) Date of Patent: Jan. 7, 2025

(54) EXTENSION SOCKET

(71) Applicant: Yujun Huang, Shenzhen (CN)

(72) Inventor: Yujun Huang, Shenzhen (CN)

( * ) Notice: Subject to any disclaimer, the term of this patent is extended or adjusted under 35 U.S.C. 154(b) by 0 days.

(21) Appl. No.: 18/431,494

(22) Filed: Feb. 2, 2024

(30) Foreign Application Priority Data

Jan. 24, 2024 (CN) .......................... 202420178805.4

(51) Int. Cl.
  *H01R 13/72* (2006.01)
  *H01R 27/02* (2006.01)
  *H02G 11/02* (2006.01)

(52) U.S. Cl.
  CPC ............. *H01R 13/72* (2013.01); *H01R 27/02* (2013.01); *H02G 11/02* (2013.01)

(58) Field of Classification Search
  CPC ......... H01R 13/72; H01R 27/02; H02G 11/02
  See application file for complete search history.

(56) References Cited

U.S. PATENT DOCUMENTS

| | | | | |
|---|---|---|---|---|
| 7,389,955 B2 * | 6/2008 | Liao | ................... | B65H 75/4431 |
| | | | | 242/378.1 |
| 2012/0320546 A1 * | 12/2012 | Wu | ........................ | H02G 11/02 |
| | | | | 361/755 |

* cited by examiner

*Primary Examiner* — Briggitte R. Hammond

(57) ABSTRACT

An extension socket includes a shell, a connecting wire, a wire box, a rotating shaft and a take-up reel. An electric connecting socket being formed in the shell, and a side wall of the shell being surrounded to form a first accommodating cavity. The electric connecting wire being electrically connected with the electric connecting socket. The wire box being arranged in the first accommodating cavity, and a side wall of the wire box being surrounded to form a second accommodating cavity. The rotating shaft being connected to an inner wall of the wire box. And the take-up reel being arranged in the second accommodating cavity and rotatably connected with the rotating shaft, and the take-up reel being used for winding the electric connecting wire.

20 Claims, 15 Drawing Sheets

EXTENSION SOCKET

CROSS-REFERENCE TO RELATED APPLICATIONS

The application claims priority of Chinese patent application CN2024201788054, filed on Jan. 24 2024, which is incorporated herein by reference in its entireties.

TECHNICAL FIELD

The present disclosure relates to the technical field of extension sockets, in particular to an extension socket.

BACKGROUND

For some extension sockets, the length of the electric connecting wire is usually fixed, which cannot meet the use requirements of users in different scenes. For example, when users need to extend the extension socket for a long distance, the electric connecting wire of the extension socket is too short to extend to the required position. For another example, most users choose to buy an extension socket with a long electric connecting wire in consideration of the need to extend the extension socket for a long distance. However, when users do not need to extend the extension socket for a long distance, the overlong electric connecting wire is scattered on the floor, which is not only unsightly, but also easy to lead to the danger of electric shocks and trip users.

SUMMARY

In order to overcome the shortcomings of the prior art, the present disclosure provides an extension socket, including:
- a shell, an electric connecting socket being formed in the shell, and a side wall of the shell being surrounded to form a first accommodating cavity;
- a connecting wire, the electric connecting wire being electrically connected with the electric connecting socket;
- a wire box, the wire box being arranged in the first accommodating cavity, and a side wall of the wire box being surrounded to form a second accommodating cavity;
- a rotating shaft, the rotating shaft being connected to an inner wall of the wire box; and
- a take-up reel, the take-up reel being arranged in the second accommodating cavity and rotatably connected with the rotating shaft, and the take-up reel being used for winding the electric connecting wire.

As the improvement of the present disclosure, a first wire port is formed in the wire box, a second wire port is formed in the shell, the electric connecting wire is wound on the take-up reel, one end of the electric connecting wire is electrically connected with the electric connecting socket, and the other end of the electric connecting wire is exposed to the wire box and the shell through the first wire port and the second wire port in turn.

As the improvement of the present disclosure, the extension socket also includes an elastic piece, one end of the elastic piece is connected with the rotating shaft, and the other end of the elastic piece is connected with the take-up reel; when the take-up reel rotates to a contracted position, the elastic piece is in a contracted state, and the electric connecting wire is wound in the take-up reel; and when the take-up reel rotates to an unfolded position, the elastic piece is in a stretched state, and the electric connecting wire is unfolded on the take-up reel.

As the improvement of the present disclosure, the extension socket also includes a toggle plate, wherein the toggle plate is rotatably connected with the take-up reel, and a sliding block is arranged on the toggle plate; an inner wall of the wire box is convexly provided with a first guide block, a second guide block, a third guide block, a fourth guide block and a fifth guide block, a contracted channel is formed among an outer side wall of the first guide block, an inner side wall of the second guide block, an inner side wall of the third guide block and an inner side wall of the fourth guide block, an unfolded channel is formed among an inner side wall of the fifth guide block, an outer side wall of the second guide block, an outer side wall of the third guide block and an outer side wall of the fourth guide block, and when the take-up reel rotates around the rotating shaft, the sliding block of the toggle plate can move in the contracted channel or the unfolded channel; the third guide block is located between the second guide block and the third guide block, the third guide block is provided with a first end and a second end, a first opening is formed between the first end and the second guide block, the outer side wall of the first guide block is provided with a first guide part protruding towards the second guide block, and when the take-up reel rotates from the contracted position to the unfolded position, the first guide part is used for pushing the sliding block to a first position, so that the sliding block can rotate along with the take-up reel to enter the unfolded channel through the first opening, and the sliding block can slide in the unfolded channel; a second opening is formed between the second end and the fourth guide block, a first clamping groove is formed in the second end, the inner side wall of the fifth guide block is provided with a second guide part protruding towards the outer side wall of the fourth guide block, and when the take-up reel rotates from the contracted position to the unfolded position, the second guide part is used for pushing the sliding block to a second position; when the second guide part pushes the sliding block to the second position and the take-up reel rotates from the unfolded position to the contracted position, the sliding block can rotate along with the take-up reel into the first clamping groove for clamping the take-up reel; an inner wall of the first clamping groove is provided with a third guide part, and when the take-up reel rotates from the contracted position to the unfolded position, the sliding block can rotate along with the take-up reel until the sliding block is separated from the first clamping groove, and the sliding block can enter the contracted channel through the second opening along the third guide part; and when the sliding block enters the contracted channel through the second opening and the take-up reel rotates from the unfolded position to the contracted position, the sliding block can slide in the contracted channel.

As the improvement of the present disclosure, the inner wall of the first clamping groove is also provided with a fourth guide part, when the second guide part pushes the sliding block to the second position and the take-up reel rotates from the unfolded position to the contracted position, the sliding block can rotate along with the take-up reel and rotate into the first clamping groove along the fourth guide part for clamping the take-up reel.

As the improvement of the present disclosure, the first clamping groove is a V-shaped first clamping groove.

As the improvement of the present disclosure, the third guide block is a third guide block with a narrow front end and a narrow rear end, the first end is arranged at the front end of the third guide block, and the second end is arranged at the rear end of the third guide block.

As the improvement of the present disclosure, the inner wall of the wire box is also provided with a sixth guide block, a contracted channel is formed among an outer side wall of the first guide block, an inner side wall of the second guide block, an inner side wall of the third guide block, the fourth guide block and an inner side wall of the sixth guide block, an unfolded channel is formed among an inner side wall of the fifth guide block, an outer side wall of the second guide block, an outer side wall of the third guide block, the fourth guide block and an outer side wall of the sixth guide block, and when the take-up reel rotates around the rotating shaft, the sliding block of the toggle plate can move in the contracted channel or the unfolded channel; the third guide block is located between one end of the second guide block and one end of the third guide block, the sixth guide block is located between the other end of the second guide block and the other end of the third guide block, the third guide block is provided with a third end and a fourth end, a third opening is formed between the third end and the fourth guide block, the outer side wall of the first guide block is provided with a fifth guide part protruding towards the fourth guide block, and when the take-up reel rotates from the contracted position to the unfolded position, the fifth guide part is used for pushing the sliding block to a third position, so that the sliding block can rotate along with the take-up reel to enter the unfolded channel through the first opening, and the sliding block can slide in the unfolded channel; a fourth opening is formed between the second end and the second guide block, a second clamping groove is formed in the fourth end, the inner side wall of the fifth guide block is provided with a sixth guide part protruding towards the outer side wall of the second guide block, and when the take-up reel rotates from the contracted position to the unfolded position, the sixth guide part is used for pushing the sliding block to a fourth position; when the first guide part pushes the sliding block to the fourth position and the take-up reel rotates from the unfolded position to the contracted position, the sliding block can rotate along with the take-up reel into the first clamping groove for clamping the take-up reel; an inner wall of the second clamping groove is provided with a seventh guide part, and when the take-up reel rotates from the contracted position to the unfolded position, the sliding block can rotate along with the take-up reel until the sliding block is separated from the second clamping groove, and the sliding block can enter the contracted channel through the fourth opening along the seventh guide part; and when the sliding block enters the contracted channel through the second opening and the take-up reel rotates from the unfolded position to the contracted position, the sliding block can slide in the contracted channel.

As the improvement of the present disclosure, the inner wall of the second clamping groove is also provided with an eighth guide part, when the sixth guide part pushes the sliding block to the fourth position and the take-up reel rotates from the unfolded position to the contracted position, the sliding block can rotate along with the take-up reel and rotate into the second clamping groove along the eighth guide part for clamping the take-up reel.

As the improvement of the present disclosure, the second clamping groove is a V-shaped second clamping groove.

As the improvement of the present disclosure, the sixth guide block is a sixth guide block with a narrow front end and a narrow rear end, the third end is arranged at the front end of the sixth guide block, and the fourth end is arranged at the rear end of the sixth guide block.

As the improvement of the present disclosure, the shell includes an upper shell, a lower shell and an intermediate shell, the upper side of the intermediate shell is detachably connected with the upper shell, the lower side of the intermediate shell is detachably connected with the lower shell, the intermediate shell divides the first accommodating cavity into a first accommodating space and a second accommodating space, the first accommodating space is formed between the upper side of the intermediate shell and the upper shell, the second accommodating space is formed between the lower side of the intermediate shell and the lower shell, the electric connecting socket is formed in the upper shell, and the wire box is arranged in the second accommodating space.

As the improvement of the present disclosure, the extension socket also includes a control mainboard, wherein the control mainboard is electrically connected with the electric connecting socket, and the control mainboard is located in the first accommodating space.

As the improvement of the present disclosure, the extension socket, also includes an electrode plate, wherein a fifth opening is formed in the wire box, the electrode plate is connected with the wire box, one end of the electrode plate is electrically connected with the electric connecting wire, and the other end of the electrode plate penetrates out of the wire box through the fifth opening and is electrically connected with the control mainboard and the electric connecting socket.

As the improvement of the present disclosure, a sixth opening is formed in the middle part of the intermediate shell, and the sixth opening communicates the second accommodating space with the first accommodating space, so that the electric connecting socket and the control mainboard are electrically connected with the electrode plate through the sixth opening.

As the improvement of the present disclosure, a first mounting groove is formed in the upper side of the intermediate shell, and a side wall of the first mounting groove is connected with an inner side wall of the upper shell; and a second mounting groove is formed in the lower side of the intermediate shell, and a side wall of the second mounting groove is connected with an outer side wall of the lower shell.

As the improvement of the present disclosure, the wire box includes an upper box body and a lower box body, and the upper box body is detachably connected with the lower box body.

As the improvement of the present disclosure, the rotating shaft is connected to the lower box body.

As the improvement of the present disclosure, a first baffle plate is arranged on the upper side of the take-up reel, the lower side of the take-up reel extends to form a plurality of mutually spaced baffle blocks, a wire slot is formed between the first baffle plate and the baffle block, and the electric connecting wire is wound in the wire slot.

As the improvement of the present disclosure, a first clamping slit is formed in the rotating shaft, one end of the elastic piece is provided with a first bending part, the other end of the elastic piece is provided with a second bending part, the first bending part is detachably inserted into the first clamping slit, a second clamping slit is formed in the take-up reel, and the second bending part is detachably inserted into the second clamping slit.

As the improvement of the present disclosure, a sleeve opening is formed in the take-up reel, and the sleeve opening rotatably sleeves the rotating shaft.

As the improvement of the present disclosure, the electric connecting socket includes a first socket and a second socket. The first socket is formed in an upper surface of the upper shell, and the second socket is formed in a side wall of the upper shell.

As the improvement of the present disclosure, the side wall of the upper shell is provided with a plurality of protruding anti-skid lines. The upper surface of the upper shell is provided with a plurality of concave decorative portions.

The present disclosure has the following beneficial effects. The present disclosure provides an extension socket. The extension socket includes: a shell, an electric connecting socket being formed in the shell, and a side wall of the shell being surrounded to form a first accommodating cavity; an electric connecting wire, the electric connecting wire being electrically connected with the electric connecting socket; a wire box, the wire box being arranged in the first accommodating cavity, and a side wall of the wire box being surrounded to form a second accommodating cavity; a rotating shaft, the rotating shaft being connected to an inner wall of the wire box; and a take-up reel, the take-up reel being arranged in the second accommodating cavity and rotatably connected with the rotating shaft, and the take-up reel being used for winding the electric connecting wire so that the electric connecting wire is wound by the take-up reel. When the extension socket needs to be used by users, the take-up reel can unfold the electric connecting wire, and the unfolded length of the electric connecting wire is adjusted according to the actual demand to meet the use requirements of users in different scenes. When the extension socket needs to be carried, stored and transported by users, the electric connecting wire can be wound to the take-up reel in the wire box so as to reduce the volume of the extension socket. At the same time, the electric connecting wire is put in good order.

BRIEF DESCRIPTION OF THE DRAWINGS

In order to explain the technical solutions of the embodiments of the present disclosure more clearly, the following will briefly introduce the accompanying drawings used in the embodiments. The drawings in the following description are only some embodiments of the present disclosure. Those of ordinary skill in the art can obtain other drawings based on these drawings without creative work.

The present disclosure is further described below in detail in combination with the accompanying drawings and embodiments.

DETAILED DESCRIPTION OF THE EMBODIMENTS

Figure 1:
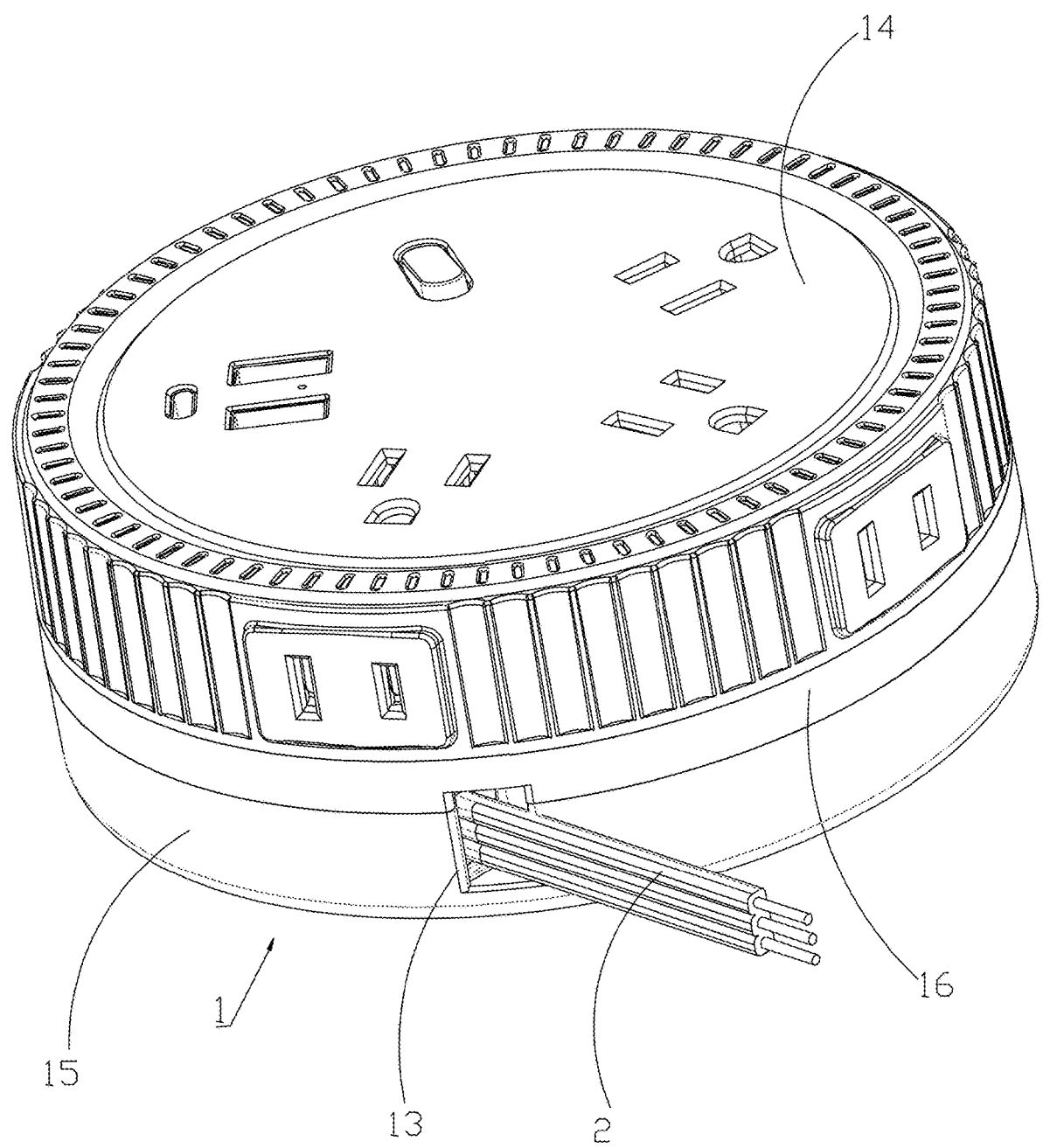
FIG. 1 is an integral structural schematic diagram of the present disclosure.
Figure 2:
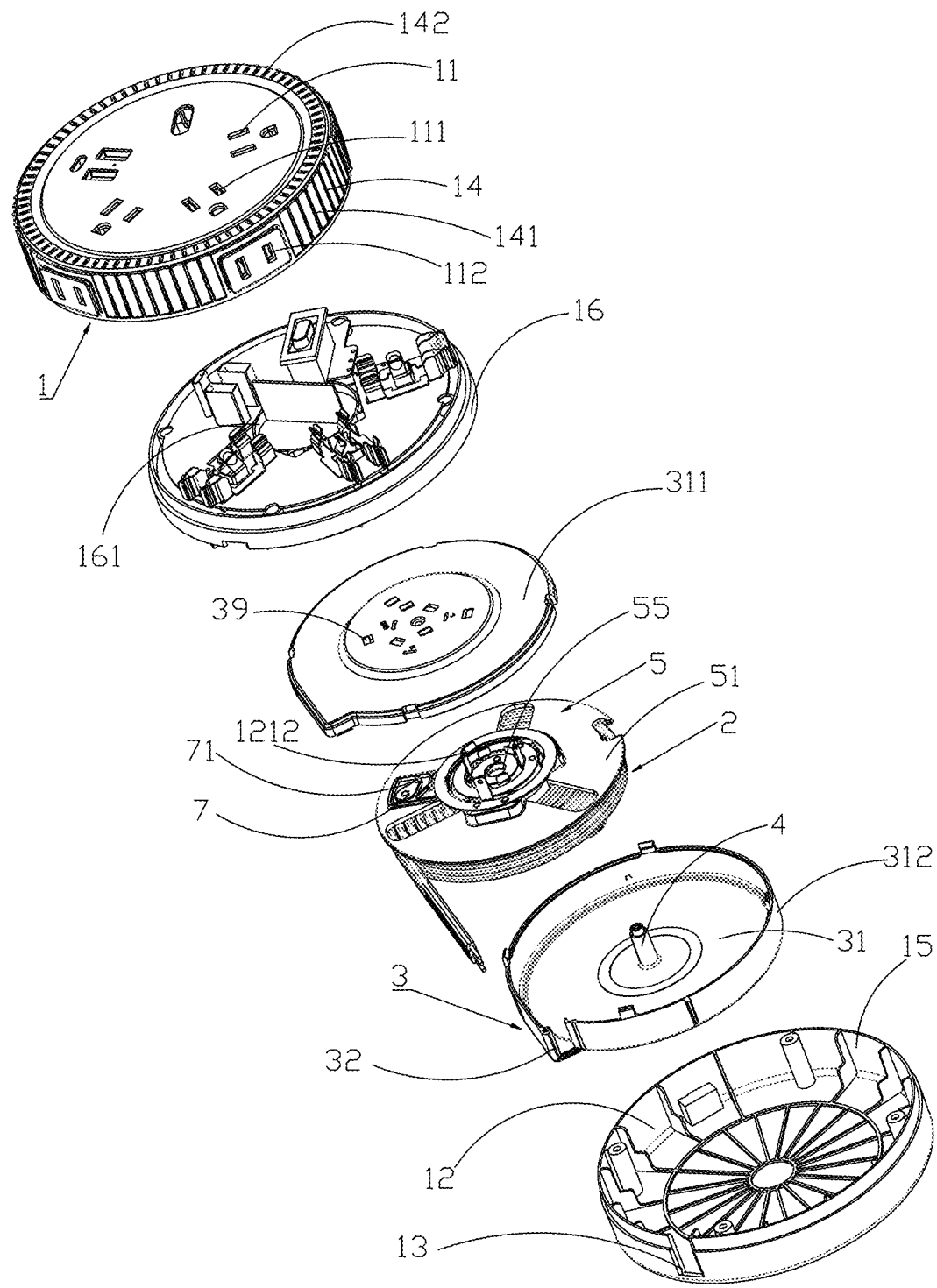
FIG. 2 is an exploded view of the present disclosure.
Figure 3:
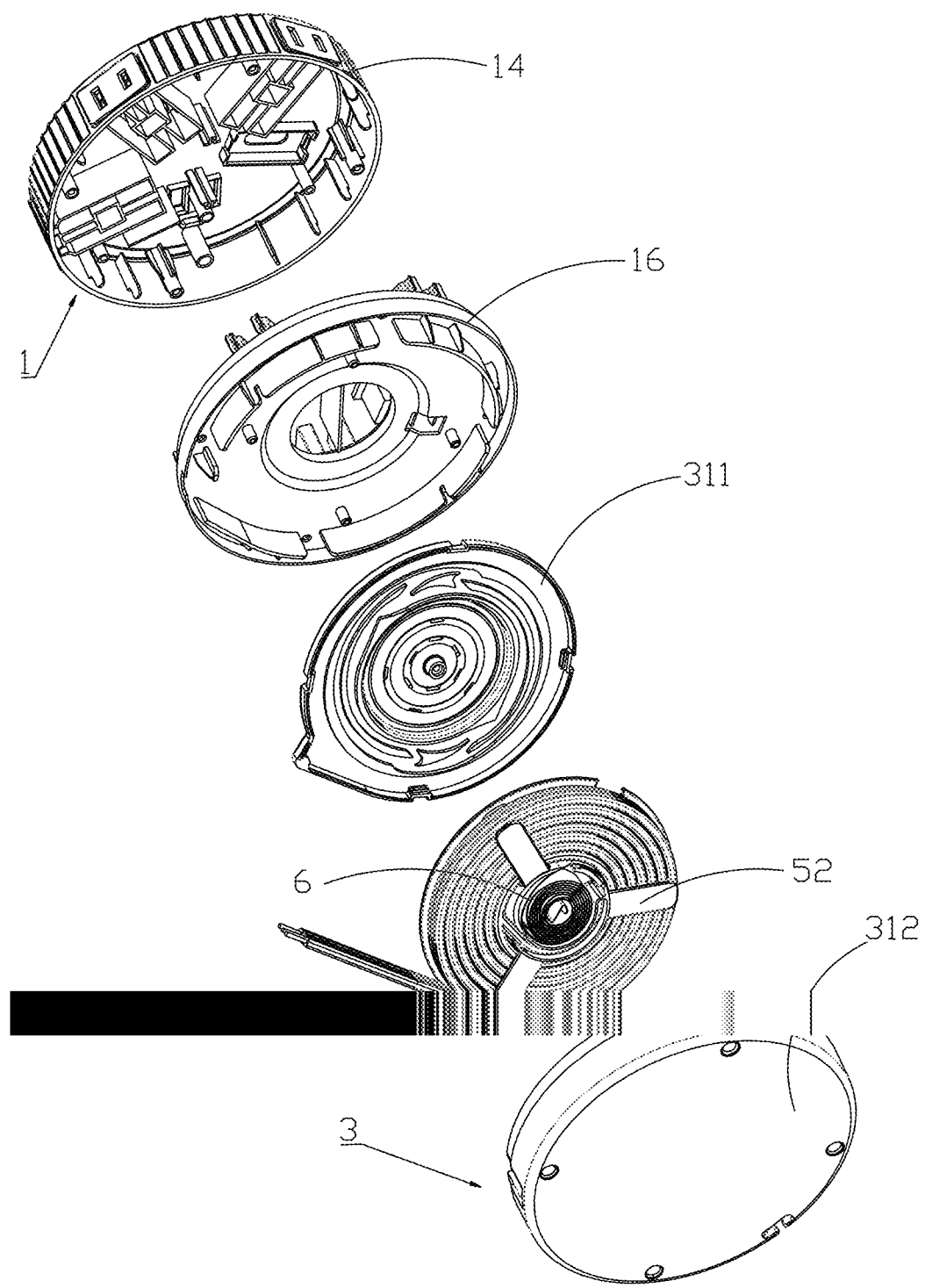
FIG. 3 is another exploded view of the present disclosure.
Figure 4:
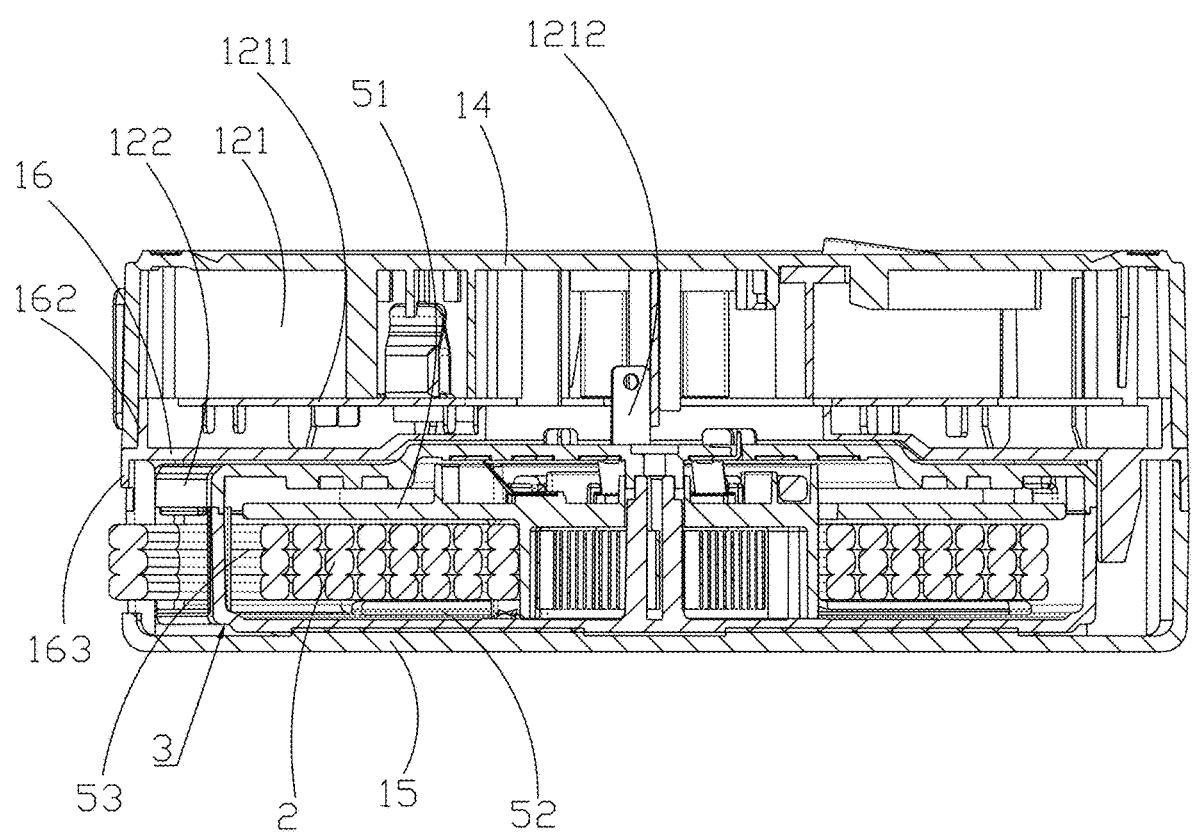
FIG. 4 is a section view sectioning along a shell and a wire box.
Figure 5:
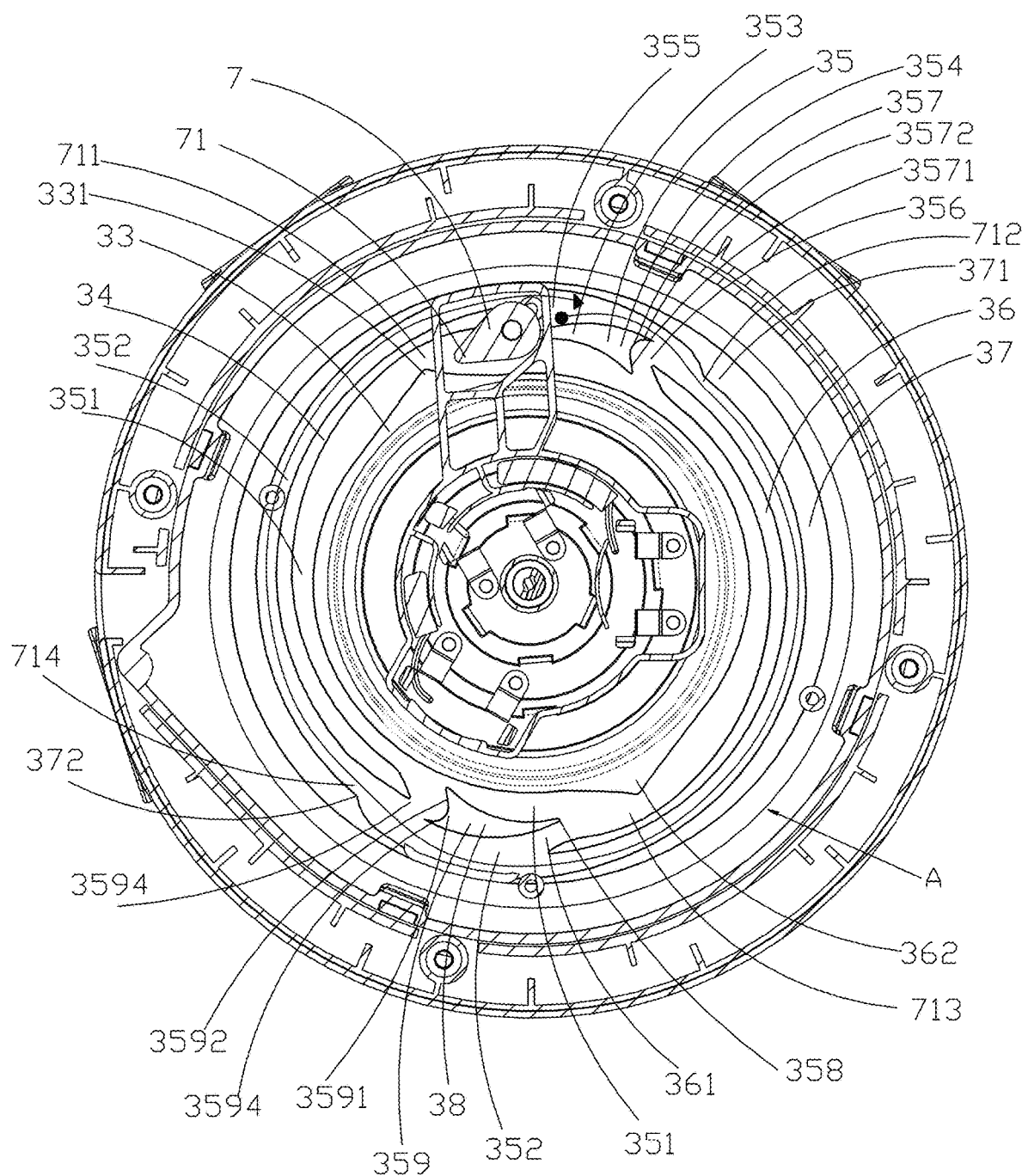
FIG. 5 is a section view sectioning along a wire box when a sliding block rotates to a first position and an unfolded path schematic diagram of a sliding block sliding along an unfolded channel.
Figure 6:
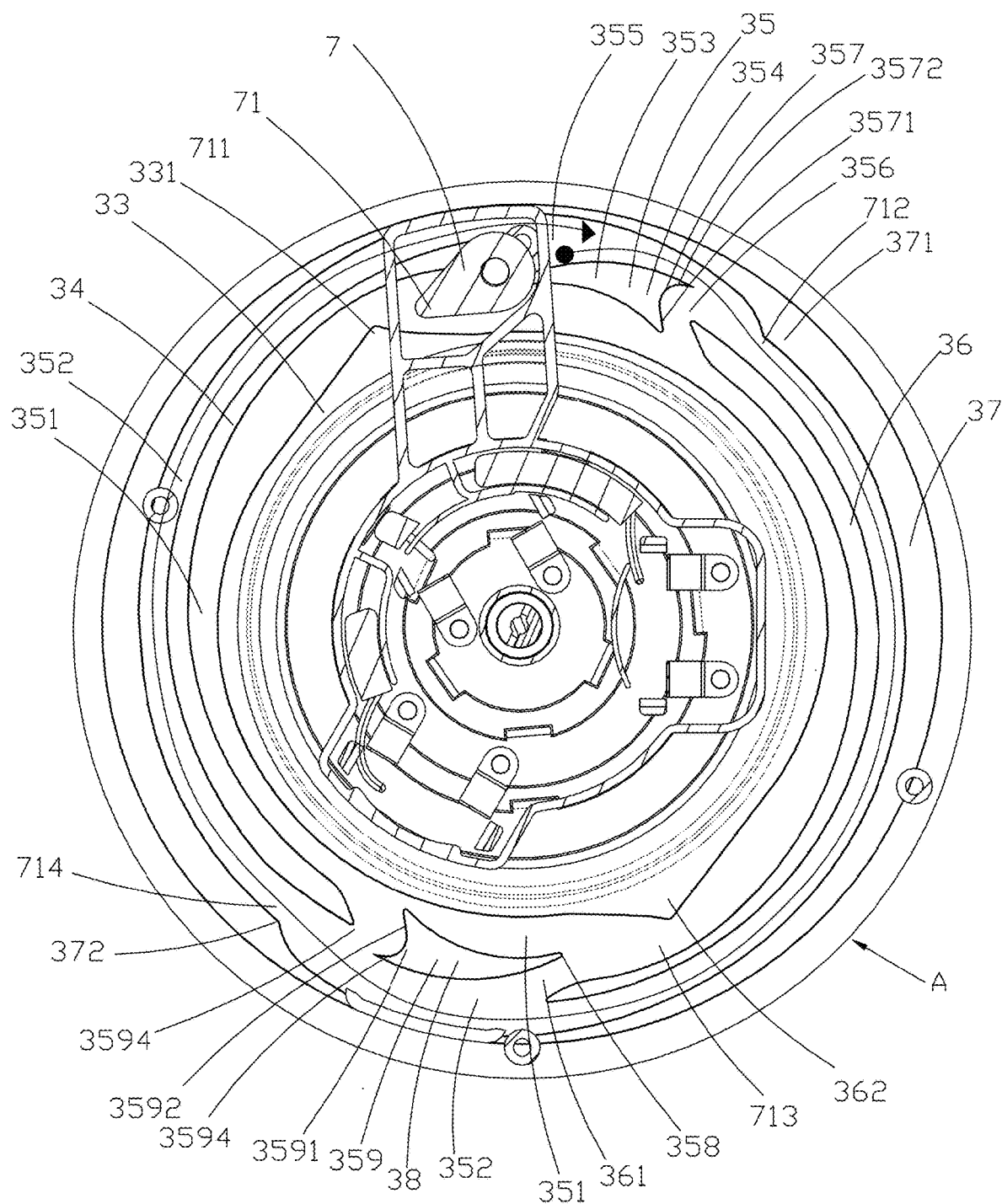
FIG. 6 is an enlarged view at the position of A in FIG. 5.
Figure 7:
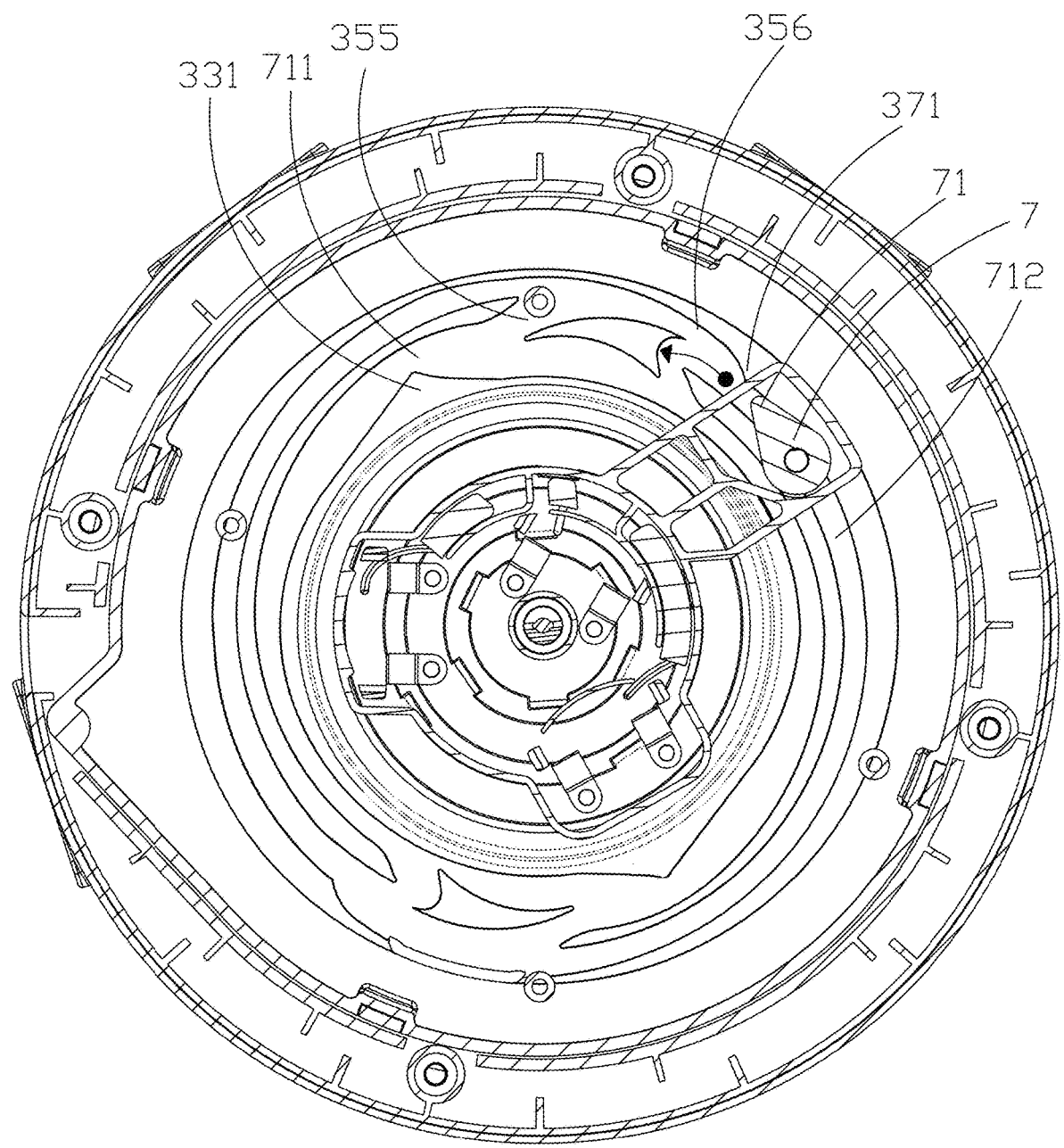
FIG. 7 is a section view sectioning along a wire box when a sliding block rotates to a second position and a path schematic diagram of a sliding block sliding towards a first clamping groove.
Figure 8:
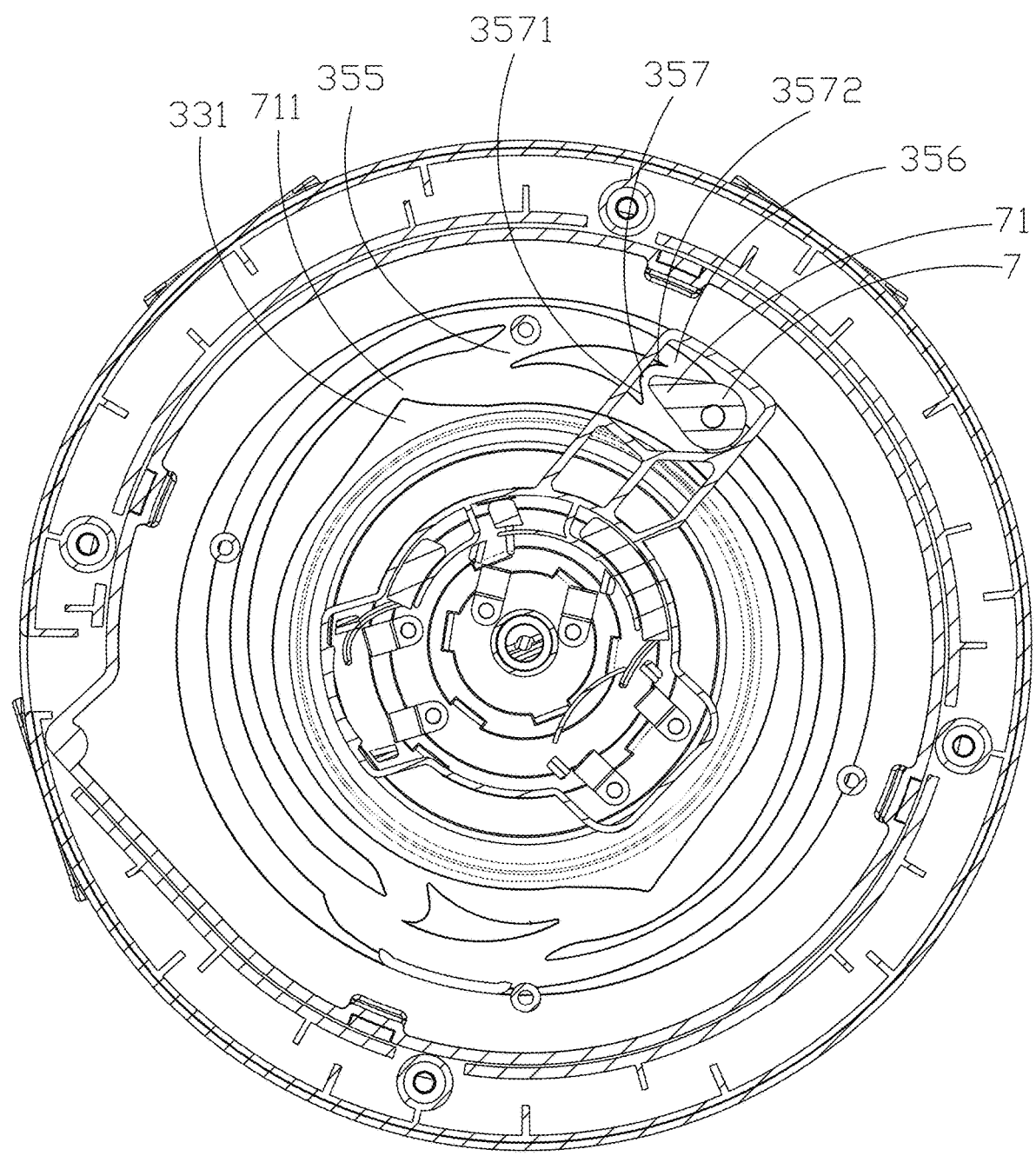
FIG. 8 is a section view sectioning along a wire box when a sliding block slides into a first clamping groove.
Figure 9:
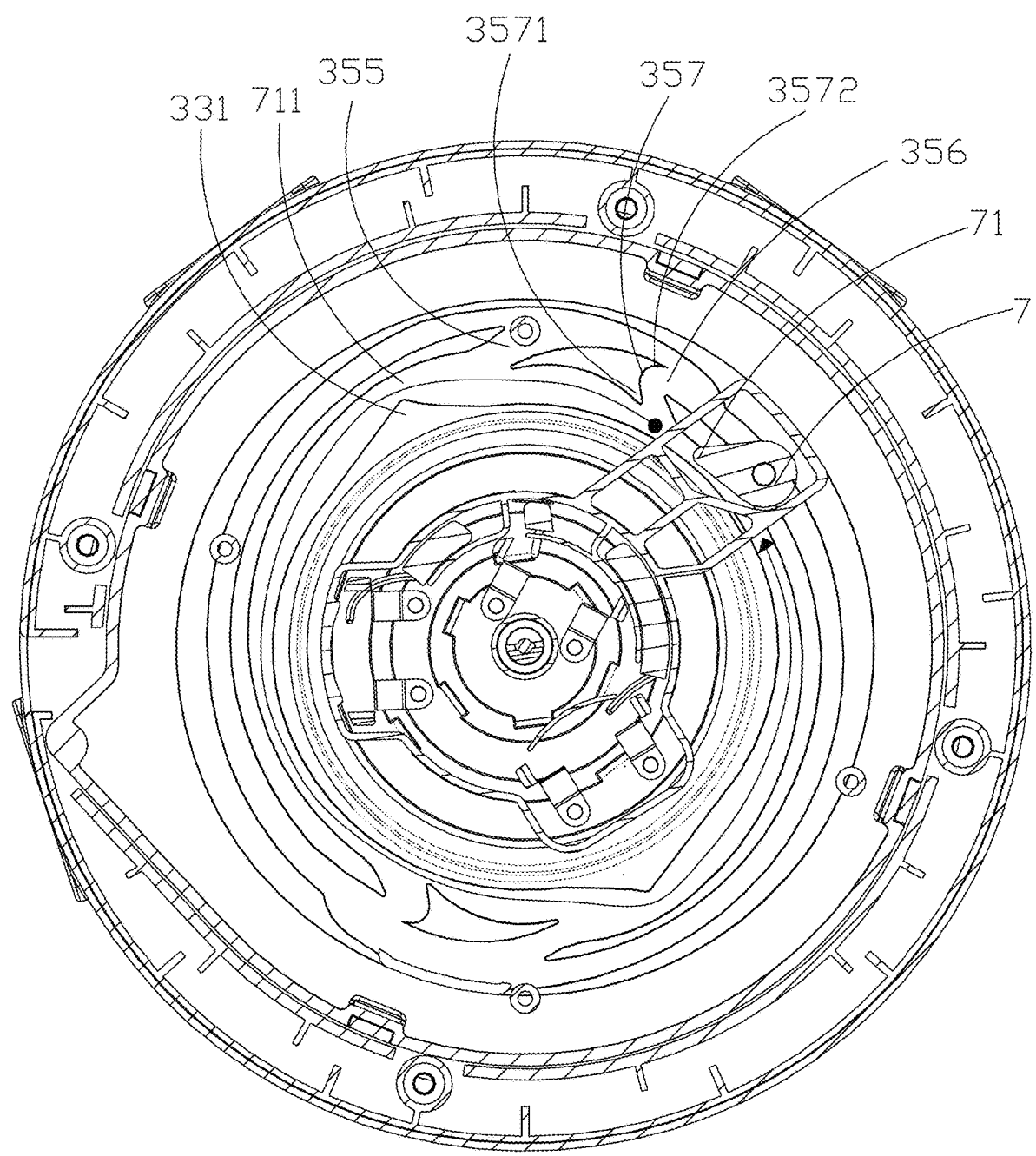
FIG. 9 is a section view sectioning along a wire box when a sliding block rotates along a fourth guide part to a contracted channel and a contracted path schematic diagram of a sliding block sliding along a contracted channel.
Figure 10:
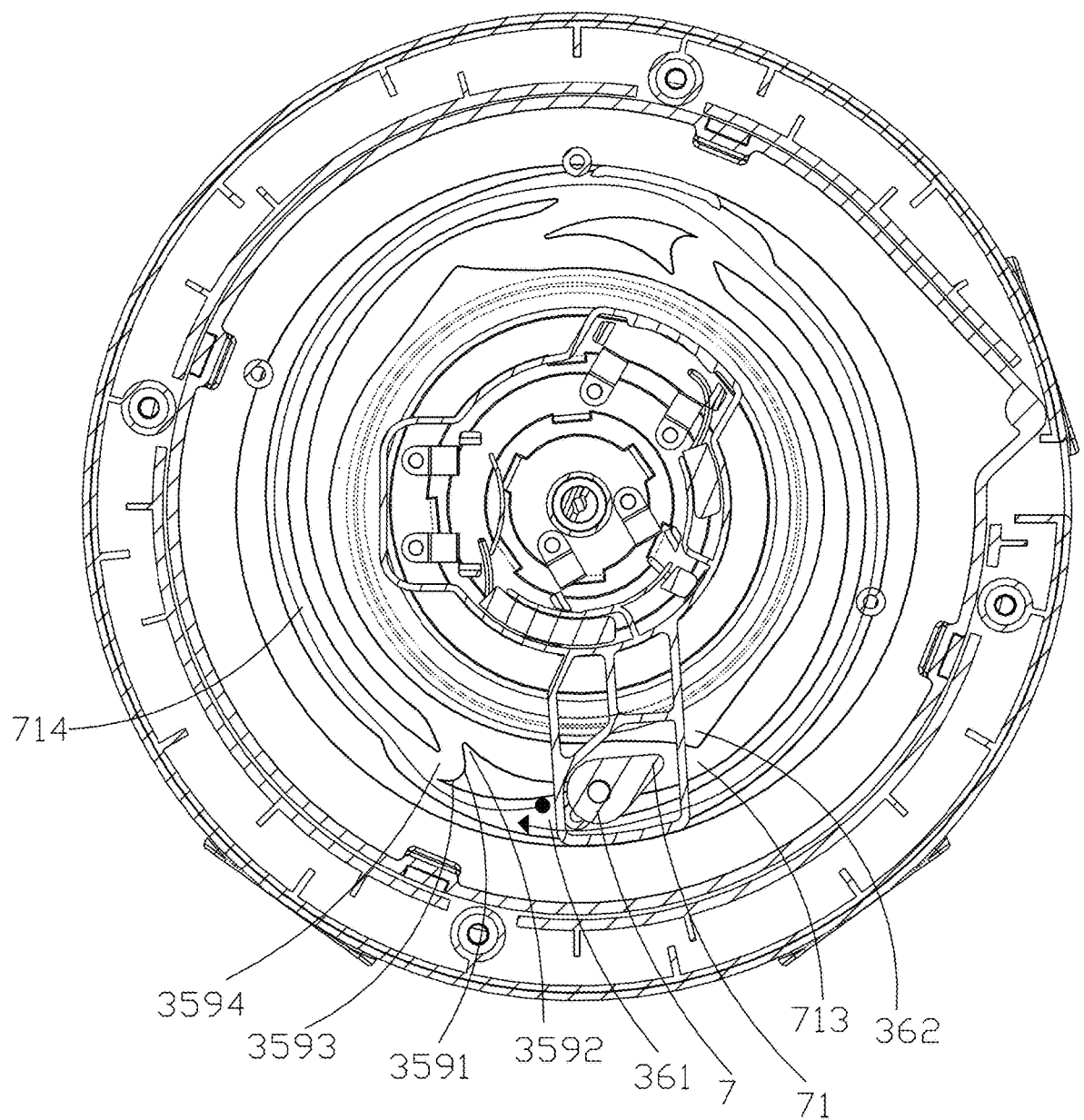
FIG. 10 is a section view sectioning along a wire box when a sliding block rotates to a third position and an unfolded path schematic diagram of a sliding block sliding along an unfolded channel.
Figure 11:
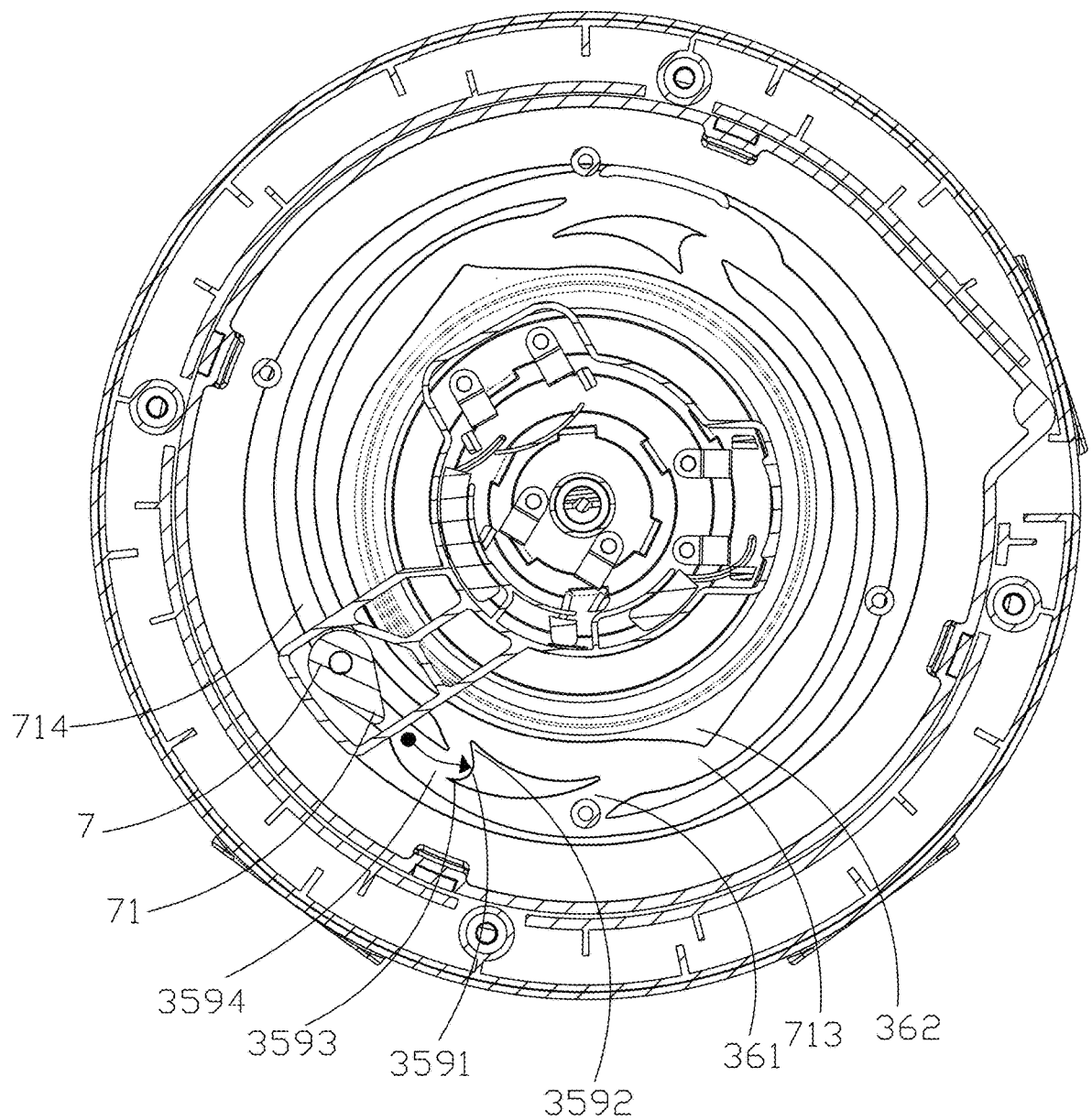
FIG. 11 is a section view sectioning along a wire box when a sliding block rotates to a fourth position and a path schematic diagram of a sliding block sliding towards a second clamping groove.
Figure 12:
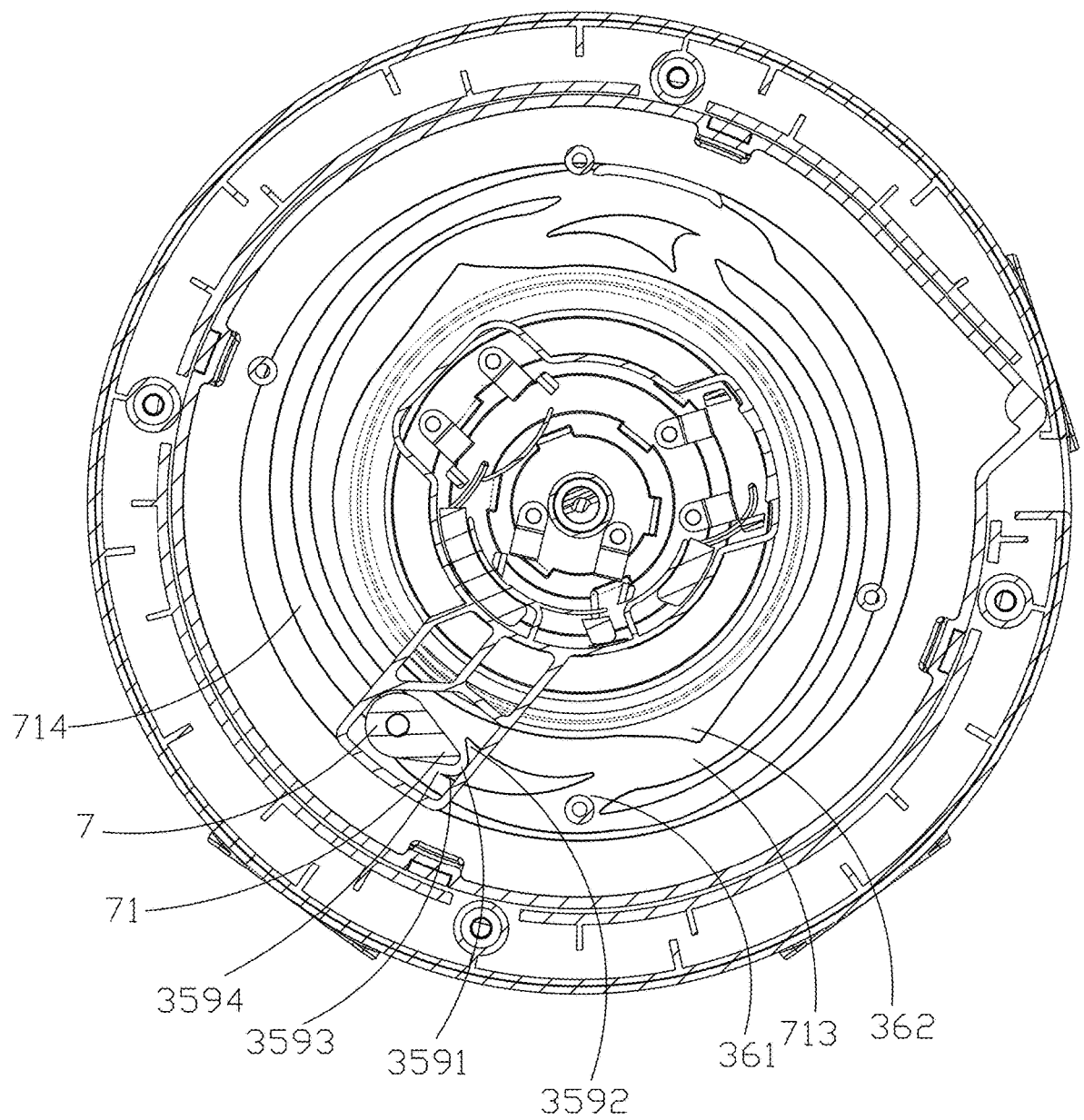
FIG. 12 is a section view sectioning along a wire box when a sliding block slides into a second clamping groove.
Figure 13:
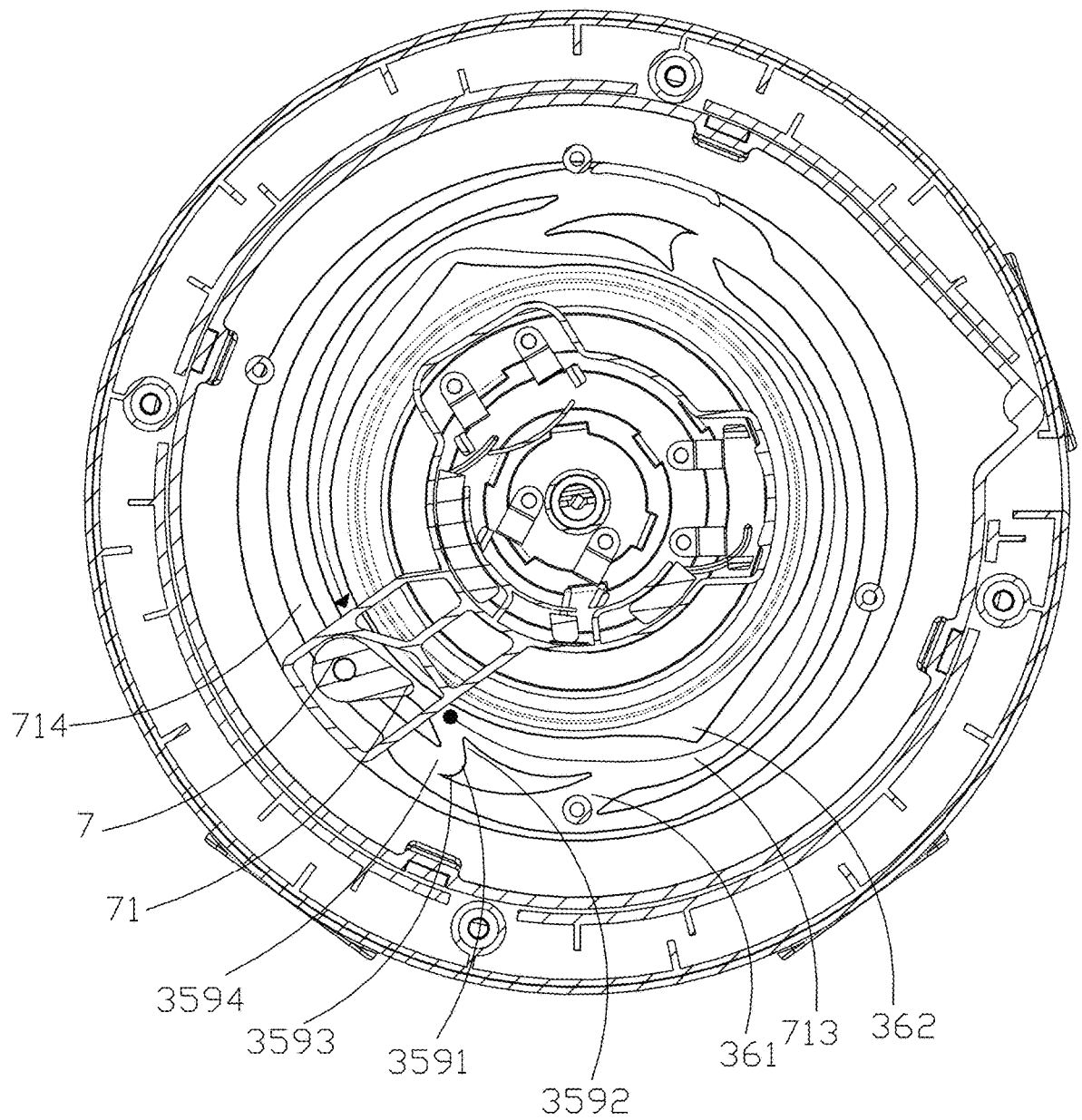
FIG. 13 is a section view sectioning along a wire box when a sliding block rotates along an eighth guide part to a contracted channel and a contracted path schematic diagram of a sliding block sliding along a contracted channel.
Figure 14:
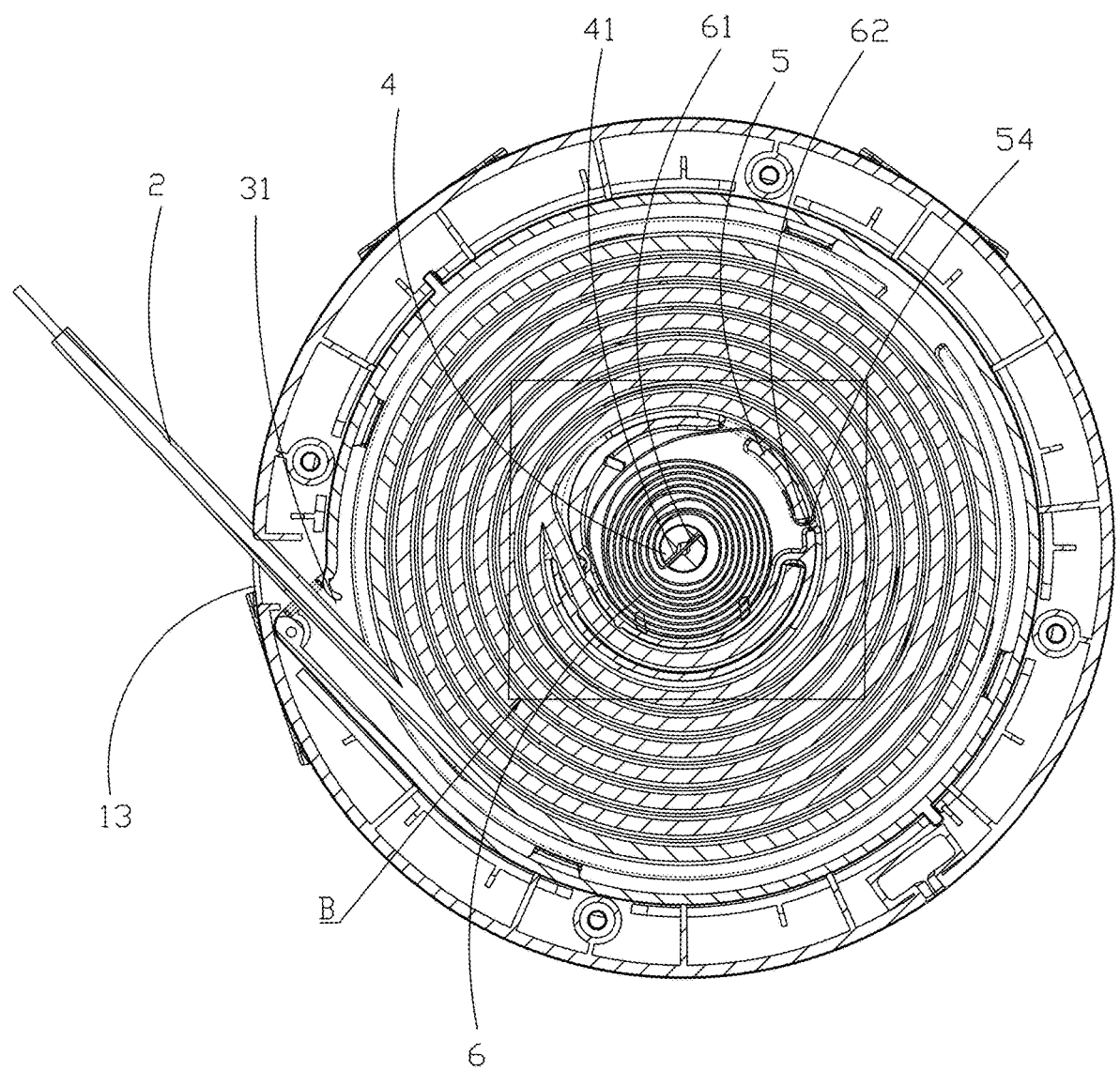
FIG. 14 is a section view sectioning along an elastic piece.
Figure 15:
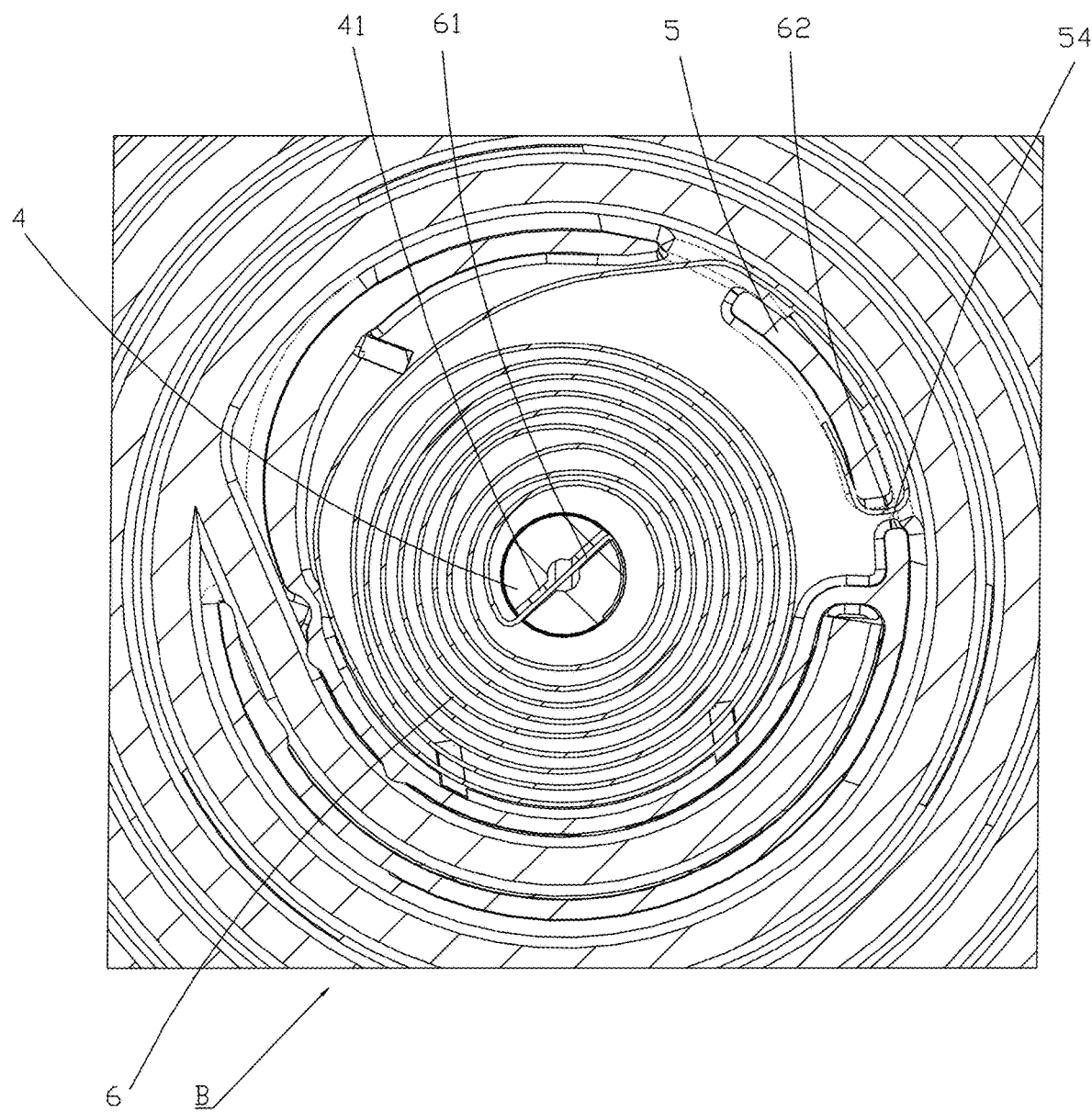
FIG. 15 is an enlarged view at the position of B in FIG. 14.

Referring to FIG. 1 to FIG. 15, an extension socket includes:
- a shell 1, an electric connecting socket 11 being formed in the shell 1, and a side wall of the shell 1 being surrounded to form a first accommodating cavity 12;
- an electric connecting wire 2, the electric connecting wire 2 being electrically connected with the electric connecting socket 11;
- a wire box 3, the wire box 3 being arranged in the first accommodating cavity 12, and a side wall of the wire box 3 being surrounded to form a second accommodating cavity 31;
- a rotating shaft 4, the rotating shaft 4 being connected to an inner wall of the wire box 3; and
- a take-up reel 5, the take-up reel 5 being arranged in the second accommodating cavity 31 and rotatably connected with the rotating shaft 4, and the take-up reel 5 being used for winding the electric connecting wire 2.

Through the above structure, the extension socket includes: a shell 1, an electric connecting socket 11 being formed in the shell 1, and a side wall of the shell 1 being surrounded to form a first accommodating cavity 12; an electric connecting wire 2, the electric connecting wire 2 being electrically connected with the electric connecting socket 11; a wire box 3, the wire box 3 being arranged in the first accommodating cavity 12, and a side wall of the wire box 3 being surrounded to form a second accommodating cavity 31; a rotating shaft 4, the rotating shaft 4 being connected to an inner wall of the wire box 3; and a take-up reel 5, the take-up reel 5 being arranged in the second accommodating cavity 31 and rotatably connected with the rotating shaft 4, and the take-up reel 5 being used for winding the electric connecting wire 2 so that the electric connecting wire 2 is wound by the take-up reel 5. When the extension socket needs to be used by users, the take-up reel 5 can unfold the electric connecting wire 2, and the unfolded length of the electric connecting wire 2 is adjusted according to the actual demand to meet the use requirements of users in different scenes. When the extension socket needs to be carried, stored and transported by users, the electric connecting wire 2 can be wound to the take-up reel 5 in the wire box 3 so as to reduce the volume of the extension socket. At the same time, the electric connecting wire 2 is put in good order.

In the embodiment, a first wire port 32 is formed in the wire box 3, and a second wire port 13 is formed in the shell 1. The electric connecting wire 2 is wound on the take-up reel 5. One end of the electric connecting wire 2 is electrically connected with the electric connecting socket 11, and the other end of the electric connecting wire 2 is exposed to the wire box 3 and the shell 1 through the first wire port 32 and the second wire port 13 in turn. Wherein, the extension socket also includes an elastic piece 6. One end of the elastic piece 6 is connected with the rotating shaft 4, and the other end of the clastic piece 6 is connected with the take-up reel 5. When the take-up reel 5 rotates to a contracted position, the elastic piece 6 is in a contracted state, and the electric connecting wire 2 is wound in the take-up reel 5. When the take-up reel 5 rotates to an unfolded position, the elastic piece 6 is in a stretched state, and the electric connecting wire 2 is unfolded on the take-up reel 5. Through the above structure, when the extension socket needs to be used by users, external force can be applied to the electric connecting wire 2 to pull the electric connecting wire 2. The take-up reel 5 can rotate to the unfolded position to unfold the electric connecting wire 2. The unfolded length of the electric connecting wire 2 can be adjusted according to the actual demand to meet the use requirements of users in different scenes. At this time, the elastic piece 6 is in a stretched state. When the extension socket needs to be carried, stored and transported by users, the external force can be released to loosen the electric connecting wire 2. Elastic reset force generated when the elastic piece 6 is stretched can pull the take-up reel 5 to rotate to the contracted position, so that the electric connecting wire 2 is wound to the take-up reel 5 in the wire box 3, and the volume of the extension socket is reduced. At the same time, the electric connecting wire 2 is put in good order.

In the embodiment, the extension socket also includes a toggle plate 7. The toggle plate 7 is rotatably connected with the take-up reel 5, and a sliding block 71 is arranged on the toggle plate 7. An inner wall of the wire box 3 is convexly provided with a first guide block 33, a second guide block 34, a third guide block 35, a fourth guide block 36 and a fifth guide block 37. A contracted channel 351 is formed among an outer side wall of the first guide block 33, an inner side wall of the second guide block 34, an inner side wall of the third guide block 35 and an inner side wall of the fourth guide block 36. An unfolded channel 352 is formed among an inner side wall of the fifth guide block 37, an outer side wall of the second guide block 34, an outer side wall of the third guide block 35 and an outer side wall of the fourth guide block 36. When the take-up reel 5 rotates around the rotating shaft 4, the sliding block 71 of the toggle plate 7 can move in the contracted channel 351 or the unfolded channel 352. The third guide block 35 is located between the second guide block 34 and the third guide block 35, the third guide block 35 is provided with a first end 353 and a second end 354. A first opening 355 is formed between the first end 353 and the second guide block 34. The outer side wall of the first guide block 33 is provided with a first guide part 331 protruding towards the second guide block 34. When the take-up reel 5 rotates from the contracted position to the unfolded position, the first guide part 331 is used for pushing the sliding block 71 to a first position 711, so that the sliding block 71 can rotate along with the take-up reel 5 to enter the unfolded channel 352 through the first opening 355, and the sliding block 71 can slide in the unfolded channel 352. A second opening 356 is formed between the second end 354 and the fourth guide block 36. A first clamping groove 357 is formed in the second end 354. The inner side wall of the fifth guide block 37 is provided with a second guide part 371 protruding towards the outer side wall of the fourth guide block 36. When the take-up reel 5 rotates from the contracted position to the unfolded position, the second guide part 371 is used for pushing the sliding block 71 to a second position 712. When the second guide part 371 pushes the sliding block 71 to the second position 712 and the take-up reel 5 rotates from the unfolded position to the contracted position, the sliding block 71 can rotate along with the take-up reel 5 into the first clamping groove 357 for clamping the take-up reel 5. An inner wall of the first clamping groove 357 is provided with a third guide part 3571. When the take-up reel 5 rotates from the contracted position to the unfolded position, the sliding block 71 can rotate along with the take-up reel 5 until the sliding block 71 is separated from the first clamping groove 357, and the sliding block 71 can enter the contracted channel 351 through the second opening 356 along the third guide part 3571. When the sliding block 71 enters the contracted channel 351 through the second opening 356 and the take-up reel 5 rotates from the unfolded position to the contracted position, the sliding block 71 can slide in the contracted channel 351. Wherein, the inner wall of the first clamping groove 357 is also provided with a fourth guide part 3572. When the second guide part 371 pushes the sliding block 71 to the second position 712 and the take-up reel 5 rotates from the unfolded position to the contracted position, the sliding block 71 can rotate along with the take-up reel 5 and rotate into the first clamping groove 357 along the fourth guide part 3572 for clamping the take-up reel 5. Specifically, the first clamping groove 357 is a V-shaped first clamping groove 357. Further, the third guide block 35 is a third guide block 35 with a narrow front end and a narrow rear end, the first end 353 is arranged at the front end of the third guide block 35, and the second end 354 is arranged at the rear end of the third guide block 35. Through the above structure, when the extension socket needs to be used by users and the take-up reel 5 rotates from the contracted position to the unfolded position, the first guide part 331 is used for pushing the sliding block 71 to the first position 711, so that the sliding block 71 can rotate along with the take-up reel 5 to enter the unfolded channel 352 through the first opening 355. The sliding block 71 can slide in the unfolded channel 352, so that the take-up reel 5 can rotate to the unfolded position to unfold the electric connecting wire 2, and the unfolded length of the electric connecting wire 2 can be adjusted according to the actual demand. After length adjustment is finished, the take-up reel 5 goes on rotating from the contracted position to the unfolded position. When the take-up reel 5 rotates to the second guide part 371, the second guide part 371 is used for pushing the sliding block 71 to the second position 712. When the second guide part 371 pushes the sliding block 71 to the second position, the electrical connecting wire 2 is loosened. The clastic reset force generated when the elastic piece 6 is stretched can drive the take-up reel 5 to rotate from the unfolded position to the contracted position. The sliding block 71 can rotate along with the take-up reel 5 into the first clamping groove 357 for clamping the take-up reel 5 so as to fix the unfolded length of the electrical connecting wire 2. When the extension socket needs to be carried, stored and transported by users, the take-up reel 5 can rotate from the contracted position to the unfolded position so as to drive the sliding 71 to rotate along with the take-up reel 5 to be separated from the first clamping groove 357, and the sliding block 71 can enter the contracted channel 351 through the second opening 356 along the third guide part 3571. When the sliding block 71 enters the contracted channel 351 through the second opening 356, the sliding block 71 can slide in the contracted channel 351. At the same time, the electrical connecting wire 2 is loosened. The elastic reset force generated when the elastic piece 6 is stretched can pull the take-up reel 5 to rotate from the unfolded position to the contracted position, so that the electrical connecting wire 2 is wound to the take-up reel 5 in the wire box 3, and the volume of the extension socket is reduced. At the same time, the electric connecting wire 2 is put in good order.

In the embodiment, the inner wall of the wire box 3 is also provided with a sixth guide block 38. A contracted channel 351 is formed among an outer side wall of the first guide block 33, an inner side wall of the second guide block 34, an inner side wall of the third guide block 35, the fourth guide block 36 and an inner side wall of the sixth guide block 38. An unfolded channel 352 is formed among an inner side wall of the fifth guide block 37, an outer side wall of the second guide block 34, an outer side wall of the third guide block 35, the fourth guide block 36 and an outer side wall of the sixth guide block 38. When the take-up reel 5 rotates around the rotating shaft 4, the sliding block 71 of the toggle plate 7 can move in the contracted channel 351 or the unfolded channel 352. The third guide block 35 is located between one end of the second guide block 34 and one end of the third guide block 35. The sixth guide block 38 is located between the other end of the second guide block 34 and the other end of the third guide block 35. The third guide block 35 is provided with a third end 358 and a fourth end 359. A third opening 361 is formed between the third end 358 and the fourth guide block 36. The outer side wall of the first guide block 33 is provided with a fifth guide part 362 protruding towards the fourth guide block 36. When the take-up reel 5 rotates from the contracted position to the unfolded position, the fifth guide part 362 is used for pushing the sliding block 71 to a third position 713, so that the sliding block 71 can rotate along with the take-up reel 5 to enter the unfolded channel 352 through the first opening 361, and the sliding block 71 can slide in the unfolded channel 352. A fourth opening 3594 is formed between the second end 354 and the second guide block 34. A second clamping groove 3591 is formed in the fourth end 359. The inner side wall of the fifth guide block 37 is provided with a sixth guide part 372 protruding towards the outer side wall of the second guide block 34. When the take-up reel 5 rotates from the contracted position to the unfolded position, the sixth guide part 372 is used for pushing the sliding block 71 to a fourth position 714. When the first guide part 331 pushes the sliding block 71 to the fourth position 714 and the take-up reel 5 rotates from the unfolded position to the contracted position, the sliding block 71 can rotate along with the take-up reel 5 into the first clamping groove 3591 for clamping the take-up reel 5. An inner wall of the second clamping groove 3591 is provided with a seventh guide part 3592. When the take-up reel 5 rotates from the contracted position to the unfolded position, the sliding block 71 can rotate along with the take-up reel 5 until the sliding block 71 is separated from the second clamping groove 3591, and the sliding block 71 can enter the contracted channel 351 through the fourth opening 3594 along the seventh guide part 3592. When the sliding block 71 enters the contracted channel 351 through the second opening 356 and the take-up reel 5 rotates from the unfolded position to the contracted position, the sliding block 71 can slide in the contracted channel 351. Wherein, the inner wall of the second clamping groove 3591 is also provided with an eighth guide part 3593. When the sixth guide part 372 pushes the sliding block 71 to the fourth position 714 and the take-up reel 5 rotates from the unfolded position to the contracted position, the sliding block 71 can rotate along with the take-up reel 5 and rotate into the second clamping groove 3591 along the eighth guide part for clamping the take-up reel 5. Specifically, the second clamping groove 3591 is a V-shaped second clamping groove 3591. Further, the sixth guide block 38 is a sixth guide block 38 with a narrow front end and a narrow rear end, the third end 358 is arranged at the front end of the sixth guide block 38, and the fourth end 359 is arranged at the rear end of the sixth guide block 38.

Through the above structure, when the extension socket needs to be used by users and the take-up reel 5 rotates from the contracted position to the unfolded position, the fifth guide part 362 is used for pushing the sliding block 71 to the third position 713, so that the sliding block 71 can rotate along with the take-up reel 5 to enter the unfolded channel 352 through the third opening 361. The sliding block 71 can slide in the unfolded channel 352, so that the take-up reel 5 can rotate to the unfolded position to unfold the electric connecting wire 2, and the unfolded length of the electric connecting wire 2 can be adjusted according to the actual demand. After length adjustment is finished, the take-up reel 5 goes on rotating from the contracted position to the unfolded position. When the take-up reel 5 rotates to the sixth guide part 372, the sixth guide part 372 is used for pushing the sliding block 71 to the fourth position 714. When the fourth guide part 3572 pushes the sliding block 71 to the second position 712, the electrical connecting wire 2 is loosened. The elastic reset force generated when the elastic piece 6 is stretched can drive the take-up reel 5 to rotate from the unfolded position to the contracted position. The sliding block 71 can rotate along with the take-up reel 5 into the second clamping groove 3591 for clamping the take-up reel 5 so as to fix the unfolded length of the electrical connecting wire 2. When the extension socket needs to be carried, stored and transported by users, the take-up reel 5 can rotate from the contracted position to the unfolded position so as to drive the sliding 71 to rotate along with the take-up reel 5 to be separated from the second clamping groove 3591, and the sliding block 71 can enter the contracted channel 351 through the fourth opening 3594 along the seventh guide part 3592. When the sliding block 71 enters the contracted channel 351 through the fourth opening 3594, the sliding block 71 can slide in the contracted channel 351. At the same time, the electrical connecting wire 2 is loosened. The clastic reset force generated when the elastic piece 6 is stretched can pull the take-up reel 5 to rotate from the unfolded position to the contracted position, so that the electrical connecting wire 2 is wound to the take-up reel 5 in the wire box 3, and the volume of the extension socket is reduced. At the same time, the electric connecting wire 2 is put in good order.

In the embodiment, the shell 1 includes an upper shell 14, a lower shell 15 and an intermediate shell 16. The upper side of the intermediate shell 16 is detachably connected with the upper shell 14. The lower side of the intermediate shell 16 is detachably connected with the lower shell 15. The intermediate shell 16 divides the first accommodating cavity 12 into a first accommodating space 121 and a second accommodating space 122. The first accommodating space 121 is formed between the upper side of the intermediate shell 16 and the upper shell 14. The second accommodating space 122 is formed between the lower side of the intermediate shell 16 and the lower shell 15. The electric connecting socket 11 is formed in the upper shell 14. The wire box 3 is arranged in the second accommodating space 122. Through the above structure, the electric connecting socket 11 is formed in the upper shell 14, and the wire box 3 is arranged in the second accommodating space 122. Therefore, the design is reasonable, and the structure is simple. The wire box 3 is arranged in the second accommodating space 122 without changing the layout of the electric connecting socket 11, so that the storage of the electric connecting wire 2 is realized.

In the embodiment, the extension socket also includes a control mainboard 1211. The control mainboard 1211 is electrically connected with the electric connecting socket 11, and the control mainboard 1211 is located in the first accommodating space 121. Wherein, the extension socket also includes an electrode plate 1211. A fifth opening 39 is formed in the wire box 3. The electrode plate 1212 is connected with the wire box 2. One end of the electrode plate 1212 is electrically connected with the electric connecting wire 2, and the other end of the electrode plate 1212 penetrates out of the wire box 3 through the fifth opening 39 and is electrically connected with the control mainboard 1211 and the electric connecting socket 11. Further, a sixth opening 161 is formed in the middle part of the intermediate shell 16. The sixth opening 161 communicates the second accommodating space 122 with the first accommodating space 121, so that the electric connecting socket 11 and the control mainboard 1211 are electrically connected with the electrode plate 1212 through the sixth opening 161. Through the above structure, the design is reasonable, the structure is simple, and the connection is stable. The electric connection among the control mainboard 1211, the electric connecting socket 11 and the electric connecting wire 2 is effectively realized.

In the embodiment, a first mounting groove 162 is formed in the upper side of the intermediate shell 16, and a side wall of the first mounting groove 162 is connected with an inner side wall of the upper shell 14. A second mounting groove 163 is formed in the lower side of the intermediate shell 16, and a side wall of the second mounting groove 163 is connected with an outer side wall of the lower shell 15. Through the above structure, the detachable connection among the intermediate shell 16, the upper shell 14 and the lower shell 15 is effectively realized.

In this embodiment, the wire box 3 includes an upper box body 311 and a lower box body 312, and the upper box body 311 is detachably connected with the lower box body 312. Wherein, the rotating shaft 4 is connected to the lower box body 312. Specifically, a first baffle plate 51 is arranged on the upper side of the take-up reel 5. The lower side of the take-up reel 5 extends to form a plurality of mutually spaced baffle blocks 52. A wire slot 53 is formed between the first baffle plate 51 and the baffle block 52. The electric connecting wire 2 is wound in the wire slot 53. Through the above structure, the electric connecting wire 2 can be more smoothly wound on the wire slot 53.

In the embodiment, a first clamping slit 41 is formed in the rotating shaft 4. One end of the elastic piece 6 is provided with a first bending part 61, and the other end of the elastic piece 6 is provided with a second bending part 62. The first bending part 61 is detachably inserted into the first clamping slit 41. A second clamping slit 54 is formed in the take-up reel 5. The second bending part 62 is detachably inserted into the second clamping slit 54. Through the above structure, the connection among the elastic piece 6, the rotating shaft 4 and the take-up reel 5 is effectively realized. When the take-up reel 5 rotates to the unfolded position, the elastic piece 6 is stretched, and the elastic reset force generated when the elastic piece 6 is stretched can drive the take-up reel 5 to rotate to the retracted position so as to wind the electric connecting wire 2.

In the embodiment, a sleeve opening 55 is formed in the take-up reel 5, and the sleeve opening 55 rotatably sleeves the rotating shaft 4. Wherein, the electric connecting socket 11 includes a first socket 111 and a second socket 112. The first socket 111 is formed in an upper surface of the upper shell 14, and the second socket 112 is formed in a side wall of the upper shell 14. Specifically, the side wall of the upper shell 14 is provided with a plurality of protruding anti-skid lines 141. The upper surface of the upper shell 14 is provided with a plurality of concave decorative portions 142. Through the above structure, the arrangement of the first socket 111 and the second socket 112 is effectively realized, the number of sockets is increased on the premise that the size of the extension socket is unchanged, and the experience of users is greatly improved.

One or more implementation modes are provided above in combination with specific contents, and it is not deemed that the specific implementation of the present disclosure is limited to these specifications. Any technical deductions or replacements approximate or similar to the method and structure of the present disclosure or made under the concept of the present disclosure shall fall within the scope of protection of the present disclosure.

What is claimed is:

1. An extension socket, comprising:
   a shell, an electric connecting socket being formed in the shell, and a side wall of the shell being surrounded to form a first accommodating cavity;
   an electric connecting wire, the electric connecting wire being electrically connected with the electric connecting socket;
   a wire box, the wire box being arranged in the first accommodating cavity, and a side wall of the wire box being surrounded to form a second accommodating cavity;
   a rotating shaft, the rotating shaft being connected to an inner wall of the wire box; and
   a take-up reel, the take-up reel being arranged in the second accommodating cavity and rotatably connected with the rotating shaft, and the take-up reel being used for winding the electric connecting wire.

2. The extension socket according to claim 1, wherein a first wire port is formed in the wire box, a second wire port is formed in the shell, the electric connecting wire is wound on the take-up reel, one end of the electric connecting wire is electrically connected with the electric connecting socket, and the other end of the electric connecting wire is exposed to the wire box and the shell through the first wire port and the second wire port in turn.

3. The extension socket according to claim 1, also comprising an elastic piece, one end of the elastic piece is connected with the rotating shaft, and the other end of the elastic piece is connected with the take-up reel; when the take-up reel rotates to a contracted position, the elastic piece is in a contracted state, and the electric connecting wire is wound in the take-up reel; and when the take-up reel rotates to an unfolded position, the elastic piece is in a stretched state, and the electric connecting wire is unfolded on the take-up reel.

4. The extension socket according to claim 3, also comprising a toggle plate, wherein the toggle plate is rotatably connected with the take-up reel, and a sliding block is arranged on the toggle plate; an inner wall of the wire box is convexly provided with a first guide block, a second guide block, a third guide block, a fourth guide block and a fifth guide block, a contracted channel is formed among an outer side wall of the first guide block, an inner side wall of the second guide block, an inner side wall of the third guide block and an inner side wall of the fourth guide block, an unfolded channel is formed among an inner side wall of the fifth guide block, an outer side wall of the second guide block, an outer side wall of the third guide block and an outer side wall of the fourth guide block, and when the take-up reel rotates around the rotating shaft, the sliding block of the toggle plate can move in the contracted channel or the unfolded channel; the third guide block is located between the second guide block and the third guide block, the third guide block is provided with a first end and a second end, a first opening is formed between the first end and the second guide block, the outer side wall of the first guide block is provided with a first guide part protruding towards the second guide block, and when the take-up reel rotates from the contracted position to the unfolded position, the first guide part is used for pushing the sliding block to a first position, so that the sliding block can rotate along with the take-up reel to enter the unfolded channel through the first opening, and the sliding block can slide in the unfolded channel; a second opening is formed between the second end and the fourth guide block, a first clamping groove is formed in the second end, the inner side wall of the fifth guide block is provided with a second guide part protruding towards the outer side wall of the fourth guide block, and when the take-up reel rotates from the contracted position to the unfolded position, the second guide part is used for pushing the sliding block to a second position; when the second guide part pushes the sliding block to the second position and the take-up reel rotates from the unfolded position to the contracted position, the sliding block can rotate along with the take-up reel into the first clamping groove for clamping the take-up reel; an inner wall of the first clamping groove is provided with a third guide part, and when the take-up reel rotates from the contracted position to the unfolded position, the sliding block can rotate along with the take-up reel until the sliding block is separated from the first clamping groove, and the sliding block can enter the contracted channel through the second opening along the third guide part; and when the sliding block enters the contracted channel through the second opening and the take-up reel rotates from the unfolded position to the contracted position, the sliding block can slide in the contracted channel.

5. The extension socket according to claim 4, wherein the inner wall of the first clamping groove is also provided with a fourth guide part, when the second guide part pushes the sliding block to the second position and the take-up reel rotates from the unfolded position to the contracted position, the sliding block can rotate along with the take-up reel and rotate into the first clamping groove along the fourth guide part for clamping the take-up reel.

6. The extension socket according to claim 4, wherein the first clamping groove is a V-shaped first clamping groove.

7. The extension socket according to claim 4, wherein the third guide block is a third guide block with a narrow front end and a narrow rear end, the first end is arranged at the front end of the third guide block, and the second end is arranged at the rear end of the third guide block.

8. The extension socket according to claim 4, wherein the inner wall of the wire box is also provided with a sixth guide block, a contracted channel is formed among an outer side wall of the first guide block, an inner side wall of the second guide block, an inner side wall of the third guide block, the fourth guide block and an inner side wall of the sixth guide block, an unfolded channel is formed among an inner side wall of the fifth guide block, an outer side wall of the second guide block, an outer side wall of the third guide block, the fourth guide block and an outer side wall of the sixth guide block, and when the take-up reel rotates around the rotating shaft, the sliding block of the toggle plate can move in the contracted channel or the unfolded channel; the third guide block is located between one end of the second guide block and one end of the third guide block, the sixth guide block is located between the other end of the second guide block and the other end of the third guide block, the third guide block is provided with a third end and a fourth end, a third opening is formed between the third end and the fourth guide block, the outer side wall of the first guide block is provided with a fifth guide part protruding towards the fourth guide block, and when the take-up reel rotates from the contracted position to the unfolded position, the fifth guide part is used for pushing the sliding block to a third position, so that the sliding block can rotate along with the take-up reel to enter the unfolded channel through the first opening, and the sliding block can slide in the unfolded channel; a fourth opening is formed between the second end and the second guide block, a second clamping groove is formed in the fourth end, the inner side wall of the fifth guide block is provided with a sixth guide part protruding towards the outer side wall of the second guide block, and when the take-up reel rotates from the contracted position to the unfolded position, the sixth guide part is used for pushing the sliding block to a fourth position; when the first guide part pushes the sliding block to the fourth position and the take-up reel rotates from the unfolded position to the contracted position, the sliding block can rotate along with the take-up reel into the first clamping groove for clamping the take-up reel; an inner wall of the second clamping groove is provided with a seventh guide part, and when the take-up reel rotates from the contracted position to the unfolded position, the sliding block can rotate along with the take-up reel until the sliding block is separated from the second clamping groove, and the sliding block can enter the contracted channel through the fourth opening along the seventh guide part; and when the sliding block enters the contracted channel through the second opening and the take-up reel rotates from the unfolded position to the contracted position, the sliding block can slide in the contracted channel.

9. The extension socket according to claim 8, wherein the inner wall of the second clamping groove is also provided with an eighth guide part, when the sixth guide part pushes the sliding block to the fourth position and the take-up reel rotates from the unfolded position to the contracted position, the sliding block can rotate along with the take-up reel and rotate into the second clamping groove along the eighth guide part for clamping the take-up reel.

10. The extension socket according to claim 8, wherein the second clamping groove is a V-shaped second clamping groove.

11. The extension socket according to claim 8, wherein the sixth guide block is a sixth guide block with a narrow front end and a narrow rear end, the third end is arranged at the front end of the sixth guide block, and the fourth end is arranged at the rear end of the sixth guide block.

12. The extension socket according to claim 1, wherein the shell comprises an upper shell, a lower shell and an intermediate shell, an upper side of the intermediate shell is detachably connected with the upper shell, a lower side of the intermediate shell is detachably connected with the lower shell, the intermediate shell divides the first accommodating cavity into a first accommodating space and a second accommodating space, the first accommodating space is formed between the upper side of the intermediate shell and the upper shell, the second accommodating space is formed between the lower side of the intermediate shell and the lower shell, the electric connecting socket is formed in the upper shell, and the wire box is arranged in the second accommodating space.

13. The extension socket according to claim 12, also comprising a control mainboard, wherein the control mainboard is electrically connected with the electric connecting socket, and the control mainboard is located in the first accommodating space.

14. The extension socket according to claim 13, also comprising an electrode plate, wherein a fifth opening is formed in the wire box, the electrode plate is connected with the wire box, one end of the electrode plate is electrically connected with the electric connecting wire, and the other end of the electrode plate penetrates out of the wire box through the fifth opening and is electrically connected with the control mainboard and the electric connecting socket.

15. The extension socket according to claim 14, wherein a sixth opening is formed in the middle part of the intermediate shell, and the sixth opening communicates the second accommodating space with the first accommodating space, so that the electric connecting socket and the control mainboard are electrically connected with the electrode plate through the sixth opening.

16. The extension socket according to claim 12, wherein a first mounting groove is formed in the upper side of the intermediate shell, and a side wall of the first mounting groove is connected with an inner side wall of the upper shell; and a second mounting groove is formed in the lower side of the intermediate shell, and a side wall of the second mounting groove is connected with an outer side wall of the lower shell.

17. The extension socket according to claim 1, wherein the wire box comprises an upper box body and a lower box body, and the upper box body is detachably connected with the lower box body.

18. The extension socket according to claim 17, wherein the rotating shaft is connected to the lower box body.

19. The extension socket according to claim 3, wherein a first baffle plate is arranged on an upper side of the take-up reel, a lower side of the take-up reel extends to form a plurality of mutually spaced baffle blocks, a wire slot is formed between the first baffle plate and the baffle block, and the electric connecting wire is wound in the wire slot.

20. The extension socket according to claim 19, wherein a first clamping slit is formed in the rotating shaft, one end of the elastic piece is provided with a first bending part, the other end of the elastic piece is provided with a second bending part, the first bending part is detachably inserted into the first clamping slit, a second clamping slit is formed in the take-up reel, and the second bending part is detachably inserted into the second clamping slit.

* * * * *